(12) United States Patent
Frome (10) Patent No.: US 8,763,016 B2
(45) Date of Patent: Jun. 24, 2014

(54) EXTERNAL DEVICE INTERFACE ABSTRACTION

(75) Inventor: Eric Allan Frome, Farmington, MN (US)

(73) Assignee: Accenture Global Services Limited, Dublin (IE)

( * ) Notice: Subject to any disclaimer, the term of this patent is extended or adjusted under 35 U.S.C. 154(b) by 163 days.

(21) Appl. No.: 13/330,163

(22) Filed: Dec. 19, 2011

(65) Prior Publication Data

US 2013/0160029 A1    Jun. 20, 2013

(51) Int. Cl.
*G06F 9/54* (2006.01)

(52) U.S. Cl.
USPC ............... 719/318; 719/321; 719/327; 705/5; 705/14.37

(58) Field of Classification Search
CPC .............. G06Q 10/02; G06Q 30/0238; G06Q 30/0237; G06Q 20/18
See application file for complete search history.

(56) References Cited

U.S. PATENT DOCUMENTS

| | | | | |
|---|---|---|---|---|
| 5,566,337 | A * | 10/1996 | Szymanski et al. | 710/260 |
| 2004/0078335 | A1 * | 4/2004 | Calvesio et al. | 705/50 |
| 2008/0184333 | A1 * | 7/2008 | McCollom et al. | 726/1 |
| 2010/0078475 | A1 * | 4/2010 | Lin et al. | 235/380 |
| 2010/0217892 | A1 * | 8/2010 | Silva et al. | 710/5 |

OTHER PUBLICATIONS

John Howes, On the Cusp of CUSS, KIOSK Europe, Spring 2006, pp. 14-18.*
John A. Dungan, The CUSS airport standard, KISOK Europe, Feb. 2, 2006, 3 Pages.*

* cited by examiner

*Primary Examiner* — H S Sough
*Assistant Examiner* — Syed Roni
(74) *Attorney, Agent, or Firm* — Fish & Richardson P.C.

(57) ABSTRACT

Implementations of the present disclosure include methods, systems, and computer-readable storage mediums for executing a user interface on a computing device, generating one or more event handlers executed on the computing device, each event handler corresponding to a local device service file, receiving first data at a first event handler of a first local device service associated with a first device that is in electronic communication with the computing device, generating, using the first event handler, a first event that includes the first data, receiving, at an external device service, the first event, generating, using the external device service, a first external device event based on the first event, and performing a first action based on the external device event.

22 Claims, 5 Drawing Sheets

EXTERNAL DEVICE INTERFACE ABSTRACTION

BACKGROUND

In some industries, such as the travel service industry, computer applications can be required to communicate with various devices. Using the travel service industry as an example, a passenger check-in application can be required to communicate with scanners, scales and/or printers to facilitate check-in of passengers and printing of documents. In some cases, the addition and/or removal of devices can require modification of the application to account for a new device and/or removal of a device.

SUMMARY

Implementations of the present disclosure include computer-implemented methods that can be performed using one or more processors and that include the actions of executing a user interface on a computing device, generating one or more event handlers executed on the computing device, each event handler corresponding to a local device service file, receiving first data at a first event handler of a first local device service associated with a first device that is in electronic communication with the computing device, generating, using the first event handler, a first event that includes the first data, receiving, at an external device service, the first event, generating, using the external device service, a first external device event based on the first event, and performing a first action based on the external device event.

In some implementations, actions further include receiving a second local device service, storing the second local device service, receiving second data at a second event handler of the second local device service associated with a second device that is in electronic communication with the computing device, generating, using the second event handler, a second event that includes the second data, receiving, at the external device service, the second event, generating, using the external device service, a second external device event based on the second event, and performing a second action based on the second external device event.

In some implementations, the first event handler subscribes to events generated by at least the first device.

In some implementations, a communication service enables communication of the first data from the first device to the first local device service. In some implementations, the communication service is exclusive to the first device and to the first local device service.

In some implementations, the first event further includes a device identifier of the first device and a type of the first data.

In some implementations, actions further include transitioning the first local device service to a "waiting for data" state after transmitting the first event from the first local device service to the external device service.

In some implementations, the first external device event includes a device identifier of the first device, a type of the first data and the first data.

In some implementations, actions further include transitioning the first local device service to a "waiting for data" state after transmitting the first event from the first local device service to the external device service.

In some implementations, an application that is executed on the computing device and that is associated with the user interface performs the first action.

In some implementations, the user interface is associated with a user interface configuration that defines one or more local device service files that are to be used.

In some implementations, the external device service is a local external device service that is executed on the computing device.

In some implementations, the external device service is a server external device service that is executed on a server, the server being in communication with the computing device.

In some implementations, each of the local device service files is provided as a dynamic link library (DLL) file.

In some implementations, the first device includes one of a scanner and a scale.

In some implementations, the computing device includes one of a kiosk and a terminal.

In some implementations, the first action includes one of checking in a passenger for travel on a travel conveyance and boarding a passenger for travel on a travel conveyance.

Implementations of the present disclosure include computer-implemented methods that can be performed using one or more processors and that include the actions of receiving, at a server computing device, a first external device request, the first external device request being generated by an application executing on a client computing device that is in communication with the server computing device, processing the first external device request to generate a server request by modifying the first external device request from a first format to a second format using a first formatter service, transmitting the server request to a device, the device performing a first action based on the server request, receiving a communication result from the device, processing the communication result to generate a server response, and transmitting the server response to the client computing device.

In some implementations, processing the first external device request includes identifying the device from a plurality of devices.

In some implementations, actions further include retrieving formatter routing data from a data service, the formatter routing data identifying the first formatter service as a formatter service that is to be used based on a type of the first external device request and the device.

In some implementations, the communication request is generated using the formatter service.

In some implementations, the formatter service comprises a dynamic-link library (DLL) that is associated with at least one of the device and a type of the first external device request.

In some implementations, the communication request includes a list of data streams that are sent to the device.

In some implementations, the first formatter service calls a data service to retrieve formatting data to format data provided in the communication request.

In some implementations, actions further include: retrieving server communication routing data from a data service, and identifying, based on the server communication routing data, a server communication service, the server computing device communicating with the device using the server communication service.

In some implementations, the server communication service is specific to a type of the device.

In some implementations, the server request is transmitted to the device using an external device service that is executed on the client computing device, the device being directly connected to the computing device.

In some implementations, the external device service receives the server request and identifies a local device service based on the server request, the local device service communicating the server request to the device.

In some implementations, a local device service of the external device service retrieves communication routing data from a data service and identifies a communication service based on the communication routing data, the local device service communicating the server request to the device using the communication service.

In some implementations, the communication service is specific to a type of the device.

In some implementations, the device comprises a printer and the formatter service is associated with the type of the printer, and the server request comprises a print request.

In some implementations, the print request includes at least one of a print boarding pass request, a print baggage tag request, a print receipt request and a print itinerary request for travel on a travel conveyance.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to enabling communication between computer programs and devices interacting with the computer programs. In some examples, a computer program issues one or more commands to a device. In some examples, a device actively provides data to the computer program (e.g., without prompting by the computer program). In accordance with implementations of the present disclosure, new devices can be added to the system and communication between applications and the devices can be quickly enabled with minimal effort.

Implementations of the present disclosure are described herein with reference to an example context that includes the travel industry, airline travel in particular. A non-limiting example used throughout the present disclosure includes passenger check-in for travel on a travel conveyance (e.g., an aircraft). It is appreciated, however, that implementations of the present disclosure are operable in other contexts.

Figure 1:
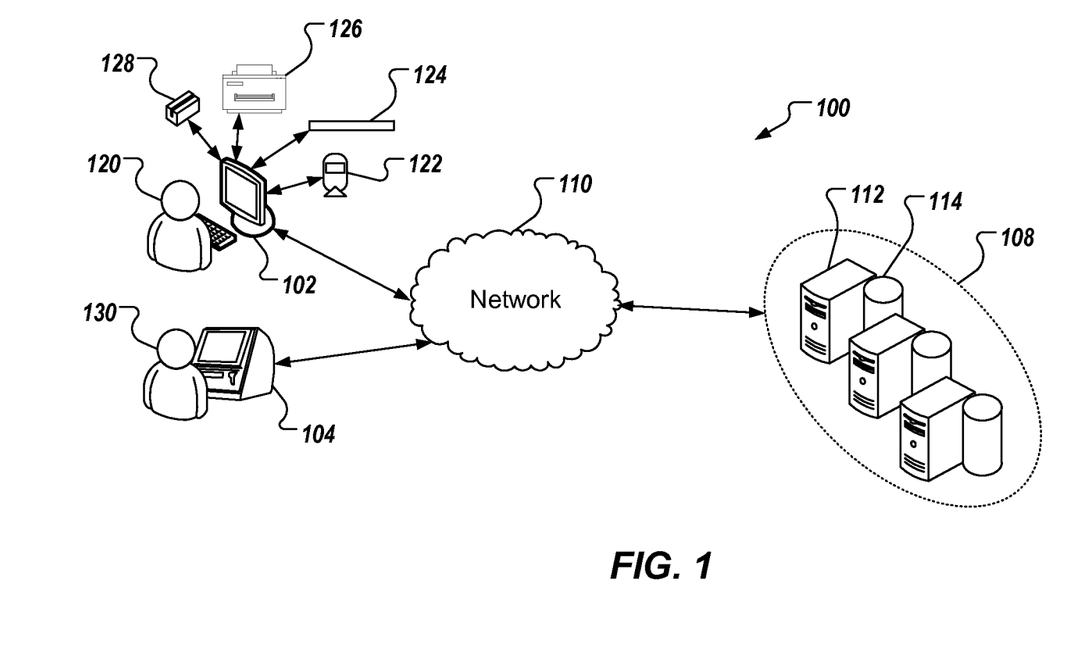
FIG. 1 is a block diagram depicting a system that is operable to execute implementations of the present disclosure.

FIG. 1 is a block diagram depicting a system 100 that is operable to execute implementations of the present disclosure. The system 100 includes one or more client devices 102, 104, one or more server devices 108 and a network 110. The client devices 102, 104 and the server devices 108 are able to communicate with one another over the network 110. The client devices 102, 104 can each be any type of appropriate computing device. In the depicted example, the client device 102 is provided as a terminal computing device and the client device 104 is depicted as a kiosk computing device, as discussed in further detail below. Each server device 108 includes a processing device 112 and a data store 114. The processing device 112 executes computer instructions (e.g., program code) stored in the data store 114 to perform functions. In some implementations, the network 110 can be a large computer network, such as a local area network (LAN), wide area network (WAN), the Internet, a cellular network, or a combination thereof connecting any number of client devices and/or server devices. In some implementations, each client (e.g., client devices 102, 104) can communicate with one or more servers (e.g., server devices 108) via a virtual private network (VPN), Secure Shell (SSH) tunnel, or other secure network connection. In some implementations, the network 110 can include the Internet, a wireless service network and may include the Public Switched Telephone Network (PSTN). In other implementations, the network 110 may include a corporate network (e.g., an intranet) and one or more wireless access points.

As noted above, implementations of the present disclosure are discussed in the non-limiting, example context of the travel industry, and a non-limiting example includes passenger check-in for travel on a travel conveyance. In this example context, the client devices 102, 104 can be devices used for passenger check-in and/or boarding to a travel conveyance (e.g., an aircraft). For example, the client device 102 can be operated by an agent 120 that checks in passengers and/or boards passengers to a travel conveyance. To that end, the client device 102 can communicate with one or more other devices that are directly connected to the client device 102. Example devices can include a scanner 122 (e.g., a barcode scanner, a QR code scanner), a scale 124 (e.g., to weigh luggage), a printer 126 (e.g., to print boarding passes and/or receipts) and a reader 128 (e.g., credit card, driver license and/or passport reader). In some examples, the scanner 122 can be a component of a device such as a boarding gate reader device. As discussed in detail below, the client device 102 can communicate with other devices that can be indirectly connected to the client device 102. For example, the client device 102 can communicate with a networked printer.

In another example, the client device 104 can include a passenger check-in kiosk and can be operated by an agent (e.g., the agent 120) and/or by a passenger 130. For example, the passenger 130 can use the client device 104 to check-in for a flight and print a boarding pass and/or a receipt. To that end, the client device 104 can include one or more other devices physically integrated therein. Example devices can include a scanner (e.g., a barcode scanner, a QR code scanner), a scale (e.g., to weigh luggage), a printer (e.g., to print boarding passes and/or receipts) and a reader (e.g., credit card, driver license and/or passport reader). As discussed in detail below, the client device 104 can communicate with other devices that can be indirectly connected to the client device 104.

Continuing with the example context, one or more of the server devices 108 can execute an integrated reservation and inventory management system ("reservation system") provided as one or more computer programs. In some examples, the reservation system enables passengers to book travel on a travel conveyance and, at the time of travel, check-in. In some examples, the reservation system enables agents of travel providers to check-in and board passengers to the travel conveyance. To that end, the client devices 102, 104 can communicate with the one or more server devices 108 to facilitate travel reservation, check-in and/or boarding using the reservation system.

A check-in workflow for travel passengers in the airline industry, for example, can include several different check-in steps, during which the reservation system is accessed. For example, a check-in workflow can include one or more steps related to searching for passenger information, assigning seats, handling baggage, adding optional services, receiving payments, and/or finalizing the passenger check-in. As an example of a passenger search step, a check-in agent can enter passenger identification information to locate a particular passenger's travel itinerary within the reservation system to begin the check-in process. For example, a reader (e.g., reader) can be used to read credit card, driver's license and/or passport information to confirm passenger identity. In a seat assignment step, the check-in agent can assign a seat to a passenger or can modify an existing seat assignment to ensure that the passenger is seated in a particular desired seat location or section. In a baggage handling step, the passenger can be allowed to check one or more bags at the check-in counter. The baggage can be weighed (e.g., using the scale 124) to ensure that the baggage adheres to weight limits. In a payment step, the passenger can provide payment for the segment or additional services, including for example, checking an oversized bag or upgrading a seat to first class. In some examples, payment can be provided using a credit card which can be read using a reader (e.g., the reader 128). After all of the other check-in procedures have been completed, a finalization step may be provided to complete the check-in process. In some examples, one or more boarding passes and/or receipts can be printed (e.g., using the printer 126).

A boarding workflow for travel passengers in the airline industry, for example, can include several different boarding steps, during which the reservation system is accessed. For example, a boarding pass can be scanned (e.g., using the scanner 122) to board the passenger. Information provided on the boarding pass can be compared with information provided in the reservation system. If there is no discrepancy, boarding of the passenger can be confirmed and recorded at the reservation system. In some examples, boarding can be visually and/or audibly confirmed using a light (e.g., a green light) and/or a tone indicating that the passenger has been boarded. If there is a discrepancy, boarding of the particular passenger can be inhibited. In some examples, inhibiting passenger boarding can be visually and/or audibly indicated using a light (e.g., a red light) and/or a tone indicating that the passenger has not been boarded. An issue preventing the passenger boarding can be resolved and the passenger can be boarded. For example, the seat information on the boarding pass might not correspond to the seat information provided in the reservation system. For example, the passenger's seat assignment might have been changed after check-in, but prior to boarding. In such an example, a new boarding pass reflecting the correct seat assignment can be printed, and the passenger can be boarded using the new boarding pass.

Implementations of the present disclosure are directed to an external device service (EDS) that enables communication between one or more devices (e.g., a scanning device, a scale, a printer, a reader) and a reservation system. In some examples, the EDS enables data generated using a device to be provided in an appropriate format for handling and processing by the reservation system and/or client devices (e.g., the client devices 102, 104). In some examples, the EDS enables data generated using the reservation system and/or client devices (e.g., the client devices 102, 104) to be provided in an appropriate format for handling and processing by a device (e.g., a scanning device, a scale, a printer, a reader). In some implementations, the EDS can include a local EDS and/or a server EDS. The local EDS can be provided on one or more client devices (e.g., the client devices 102, 104) and the server EDS can be provided on one or more server devices (e.g., the server devices 108). The EDS can be provided as one or more computer programs that can be executed using one or more processors.

Figure 2:
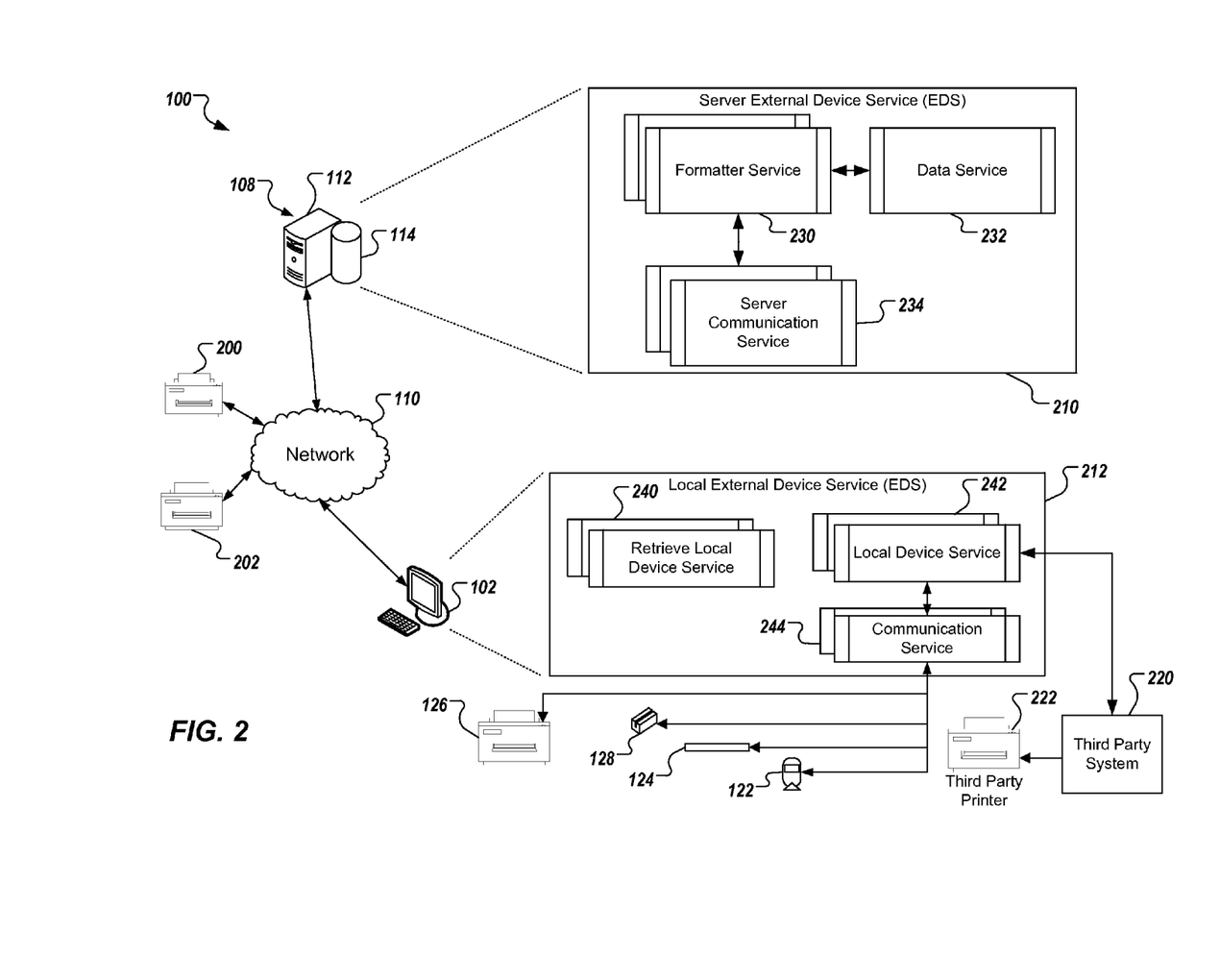
FIG. 2 is a detailed block diagram of components of the system of FIG. 1.

FIG. 2 is a detailed block diagram of components of the system 100 of FIG. 1. In FIG. 2, the system 100 includes the client device 102, a server device 108 and the network 110. As discussed in further detail herein, the client device 102 can be in communication with the scanner 122, the scale 124, the printer 126 and/or the reader 128. Although the client device 104 of FIG. 1 is not depicted in FIG. 2, it is appreciated that implementations of the present disclosure are readily operable with the client device 104 and any other appropriate client device. Further, and although a single server device 108 is depicted in FIG. 2, it is appreciated that implementations of the present disclosure are readily operable with one or more server devices 108. In FIG. 2, the system 100 further includes a printer 200 and a printer 202. In some examples, the printer 200 can include a networked printer. In some examples, the printer 202 can include a Transmission Control Protocol/Internet Protocol (TCP/IP) printer. In some examples, a networked printer includes a printer that uses print drivers setup in an operating system. In some examples, a TCP/IP printer includes a printer that directly receives raw data over a TCP/IP communication port.

The server device 108 executes a server EDS 210 and the client device 102 executes a local EDS 212. In some examples, the local EDS 212 can be provided as part of a user interface (UI) executed on the client device 102. As discussed in further detail herein, the server EDS 210 enables data to be communicated to and/or from devices (e.g., the printers 200, 202), and/or to and/or from the local EDS 212. Similarly, the local EDS 212 enables data to be communicated to and/or from devices (e.g., the scanner 122, the scale 124, the printer 126, the reader 128, the printers 200, 202), and/or to and/or from the server EDS 210.

In some examples, the local EDS 212 enables data to be communicated to and/or from a third party system 220 that can be in further communication with a third party device. In the depicted example, a third party device 222 is provided as a third party printer, but is not limited to third party printers. In some examples, the third party device can include a common use terminal equipment (CUTE) system or a common use self-service (CUSS) system. An example CUTE system can include an agent terminal that is travel service provider agnostic and that can be used by various travel service providers over a given time period. For example, the agent terminal can be used by a first travel service provider for checking in and/or boarding passengers for a travel conveyance that is operated by the first travel service provider. The agent terminal can be subsequently used by a second travel service provider for checking in and/or boarding passengers for another travel conveyance that is operated by the second travel service provider. In this manner, a single gate, at an airport for example, can be used by different airlines (i.e., travel service providers). An example CUSS system can include a check-in kiosk that is travel service provider agnostic and that can be used by passengers to check in for a travel conveyance regardless of the particular travel service provider that they are traveling with.

The server EDS 210 includes one or more formatter services 230, a data service 232 and one or more server communication services 234. In some examples, each formatter service 230 can be provided as a dynamic-link library (DLL) and can be associated with a particular type of external device and/or a particular type of request. For example, a formatter service 230 can be associated with a particular type of printer and print request. Within the example context of airline travel, example print requests can include a print boarding pass request, a print baggage tag request, a print receipt request and a print itinerary request, and example types of printers can include a networked printer, a TCP/IP printer, a local printer (i.e., connected to a client device), or a third party printer. The formatter service 230 generates a particular data stream based on the type of external device and the request. For example, the formatter service 230 converts the request from a format that the request was originally provided in (a first format) to a format that the external device can process (a second format). The formatter service 230 also processes communication results received back from an external device. In some examples, the formatter service 230 translates the communication results from a format of the external device (the second format) to a format for further processing by the UI (the first format), as discussed in further detail below.

In some examples, the data service 232 can be provided as one or more computer program modules or sub-modules. The data service 232 can provide information that defines how a data stream should be formatted for a particular type of external device and/or a particular type of request. In some examples, the data service 232 provides formatting information to a formatter service 230 that is handling a particular request (i.e., that is formatting the data stream). In some examples, the data service 232 retrieves the formatting information from a database. In some examples, the data service 232 retrieves the formatting information from a default file stored on the server.

In some examples, each server communication service 234 can be provided as a DLL. The server communication service 234 determines how the formatted request is to be communicated to the external device. In some example, the external device can include a networked device (e.g., the printers 200, 202). In some examples, the external device can include a local device that is connected to a client device (e.g., the client device 102, 104). Consequently, the server communication service 234 determines whether the request is to be transmitted directly to the external device over the network or indirectly to the external device over the network and through the client device (e.g., using a duplex contract connection).

The local EDS 212 includes one or more retrieve local device services 240, one or more local device services 242 and one or more communication services 244. In some examples, each retrieve local device service 240 can be provided as a DLL that is associated with a particular external device. The retrieve local device services 240 determine which local device services 242 are to be used with the local EDS 212. In some examples, the retrieve local device services 240 determine which devices are connected to the client device and retrieve a local device service 242 associated with each device. In some examples, the devices can include devices that are set-up with the operating system of the client device. In some examples, retrieve local device services can determine that the client device is a third party common use workstation and retrieve a list of available devices. In some examples, retrieve local device services can retrieve data from a database regarding available TCP/IP devices (e.g., printers) that can be accessed on the client's network but not the server's network.

In some examples, the retrieve local device services 240 retrieve local device services 242 upon start-up of the application that executes the UI. In some examples, each local device service 242 can be provided as one or more computer program modules or sub-modules and handles requests to and response from devices. In some examples, one or more local device services 242 can communicate with an associated device through a communication service (e.g., via a driver). In some examples, one or more local device services can communicate with a device through a third party system (e.g., a device connected to a CUTE system and/or CUSS system). In some examples, one or more local device services 242 can directly interact with the client device 102 (e.g., to perform a "Print to File" operation).

In some examples, each communication service 244 can be provided as a DLL and coordinates communication between a local device service 242 and an associated device. For example, the device can include a printer, and the communication service 244 can determine whether communication with the printer is achieved directly or through a driver (e.g., converting the request to bytes to be processed by a driver), and can facilitate such communication. Communication services 244 can facilitate communication with devices such as printers, boarding gate readers (e.g., including machine-readable scanners), scales, readers, scanners and the like.

In some implementations, when the client device 102 is activated the UI can be executed. The UI enables operator interaction with the client device 102 for passenger check-in and/or boarding, for example. In some examples, the local EDS 212 is executed as part of the UI. The local EDS 212 retrieves relevant RLDSs 240 and LDSs 242. In some examples, a UI configuration defines which RLDSs 240 and LDSs 242 that are to be retrieved. In some examples, the local EDS 212 retrieves LDSs 242 from any retrieved RLDSs 240. For example, an RLDS 240 can communicate with a third party application to generate a list of LDSs 242 to be used with the third party application. In some examples, the UI configuration can include a combination of RLDS and LDS entries that are defined. When the UI starts up, all RLDS and/or LDS entries are retrieved and a list of LDSs is generated. This list of LDSs can include the LDS entries from as well as LDSs that are retrieved by one or more RLDS.

Event handlers are setup on all active LDSs 242. In some examples, an active LDS is a service that handles devices that can actively send data to an application without any action from the application. Examples of this include a barcode scanner (e.g., the scanner 122) and a reader (e.g., the reader 128). For example, a passenger boarding application can be executed on the client device 102 and the barcode scanner can scan a barcode of a boarding pass to generate corresponding data that is processed through the boarding application. A passive LDS is a service that wraps devices that will not send data except in response to an application action. An example is a printer (e.g., the printer 126)), where the application sends the print stream to the printer before the printer response is returned.

The UI registers with the local EDS 212 for all events from the active LDS. In some examples, the UI subscribes to active LDS events, such that a published LDS event is provided to the UI in a publish/subscribe paradigm.

In accordance with implementations of the present disclosure, one or more external devices can be connected and can be communicated with without disrupting the base system. In general, when an external device is added (e.g., a networked device and/or a local device), the UI configuration is updated and one or more DLLs are added. In some examples, the UI configuration is updated to identify a particular DLL that is to be used based on device type and request. In some examples, the one or more DLLs can include a formatter service 230 and/or a server communication service 234 at the server EDS 210, and/or a retrieve local device service 240 at the local EDS 212. In this manner, new external devices can be quickly integrated into the overall system with minimal effort (e.g., no direct coding is required in the application executing on the client device).

In some examples, an active device can send data to the application executing on the client device without prompting by the application. For example, the scanner 122 can scan a machine-readable code (e.g., a barcode or a QR code) to generate scanned data. The scanned data is communicated to a corresponding LDS 242 (i.e., the LDS that handles the particular device) through a corresponding communication service 244 (i.e., the communication service that enables communication with the particular device). The LDS that handles the particular device receives the scanned data and generates an LDS event that includes the scanned data. In some examples, the LDS event includes a device identifier, the type of data (e.g., barcode data, credit card data) and the scanned data. By using an LDS event, the LDS is able to hand off the handling of the event to the application executed on the client device and can return to a "waiting for data" state. In this manner, the LDS does not miss a scan while the last scanned data is processed.

The local EDS 212 handles the LDS event and generates an EDS event that includes the scanned data. In some examples, the EDS event can include the device identifier, the type of data (e.g., barcode data, credit card data) and the scanned data. By using the EDS event, the EDS is able to hand off the handling of the event to the application executed on the client device and return to a "waiting for data" state (i.e., waiting for data from an active LDS). In this manner, the EDS does not miss LDS event while the most recently received data is processed. Accordingly, two layers of events (LDS events and EDS events) can be provided. In this manner, the EDS can function as a single point of communication to the external device service. That is, it is up to the EDS to gather and handle events from all of the different LDSs. The UI and the application handle the EDS event and perform some action based thereon. For example, a passenger can be boarded in response to the EDS event.

In some examples, the client device 102 can request that a non-local device be used to execute some function. For example, the client device 102 can request that a document (e.g., a boarding pass) be printed using one of the printers 200, 202. In some examples, the UI can generate an external device request and can send the external device request to the server device 108 over the network 110. In some examples, the request from the client device 102 to the server device 108 can include information to identify the type of document to be printed, and which passenger and flight(s) should be included on the boarding pass. The server device 108 can process the external device request to identify which device should be used to fulfill the external device request and builds a server EDS request. In some examples, the EDS request includes a large amount of data associated with the booking, passengers and/or flights. In this manner, the data is available to be printed on documents (e.g., receipts, boarding passes) and can be tailored for the purposes of a particular travel service provider.

The server EDS request is processed using the server EDS 210. In some examples, the server EDS 210 retrieves formatter routing data from the data service 232 and uses the formatter routing data to determine which formatter service 230 to use based on the given request type and the external device. The server EDS uses the identified formatter service 230 to build a communication request. In some examples, the communication request can include a list of data streams that will be sent to the device. In some examples, the formatter service 230 is also able to call a third party to retrieve appropriate data streams. In some examples, the formatter service 230 takes the given request and external device to build the communication request. In some examples, the formatter service 230 can call the data service 232 to retrieve formatting data. In some examples, the formatter service 230 can use intelligent formatting technology to format the data.

The server EDS 210 retrieves server communication routing data from the data service 232. The server EDS 210 uses the server communication routing data to identify a server communication service 234 based on the given external device. The server EDS 210 uses the identified server communication service 234 to communicate with the external device. The server communication service can transmit the server EDS request to the external device.

In some implementations, the server EDS request can be transferred by TCP/IP (e.g., to the printer 202) or network 110 for direct communication with the external device (i.e., direct communication from the server device 108 to the external device). The server EDS request is transmitted directly to the external device, and the external device can return a result of the communication.

In some implementations, the server EDS request can be indirectly communicated to the external device. For example, the server EDS 210 can communicate with the local EDS 212 using a contract (e.g., a duplex contract) back to the UI for local communication with the external device. In some examples, the local EDS 212 receives the server EDS request and identifies a LDS 242 based thereon. The LDS 242 communicates the server EDS request to the external device. In some examples, the LDS 242 retrieves the local communication routing data from the data service 232 of the server EDS 210 to determine which communication service 244 to use. In some examples, the LDS 242 can communicate with the data service 232 through a WCF connection over the network 110. The selected communication service 244 transmits the server EDS request directly to the external device and the result of the communication with the device is returned. In some examples, an LDS 242 can communicate with devices through a third party system (e.g., the printer 222 of the third party system 220). The result of the communication with the third party system is returned. The result of the communication with the external device is returned from the LDS 242 to the server EDS 210, from which the server EDS request had originated. The local EDS 212 returns the communication result of using the external device to the server communication service 234.

In some implementations, the result of the communication with the external device (whether direct or through the local EDS 212) is returned from the server communication service 234 to the formatter service 230. The formatter service 230 translates the communication result into a server EDS response. For example, a device and/or third party systems can return an error code (e.g., printer out of paper error). The formatter service 230 is able to translate received error codes and into a message that can be processed by the application executing on the client device (e.g., to display a "Printer Out of Paper" message). The server device 108 transmits the server EDS response to the client device 102. The client device 102 processes the server EDS response and the UI displays the result of using the external device to the user.

Figure 3:
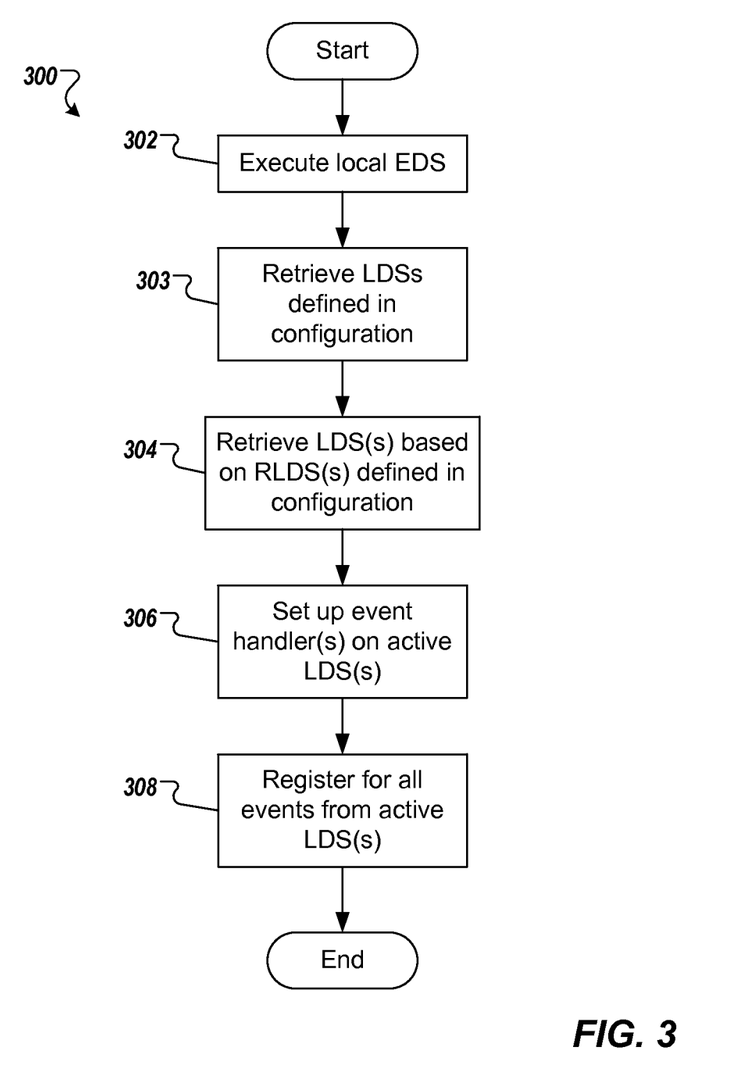
FIG. 3 is a flowchart illustrating an example process that can be executed in implementations of the present disclosure.

FIG. 3 depicts a flowchart of an example process 300 that can be executed in implementations of the present disclosure. The example process 300 can be provided using one or more computer programs that can be executed using one or more computing devices (e.g., the client device 102 and/or the client device 104). The example process 300 can be executed to enable a user interface executing on a computing device to receive data from one or more active devices communicating with the computing device.

A local EDS is executed (302). For example, the local EDS 212 can be executed as part of a UI executing on the client device 102. One or more LDSs defined in the UI configuration are retrieved (303). One or more relevant RLDSs are processed based on the UI configuration to retrieve indicated LDSs (304). For example, the local EDS 212 processes the RLDSs 240 to determine which LDSs 242 are to be retrieved. Event handlers are setup on all active LDSs (306). The UI registers with the local EDS for all events from the active LDSs (308).

Figure 4:
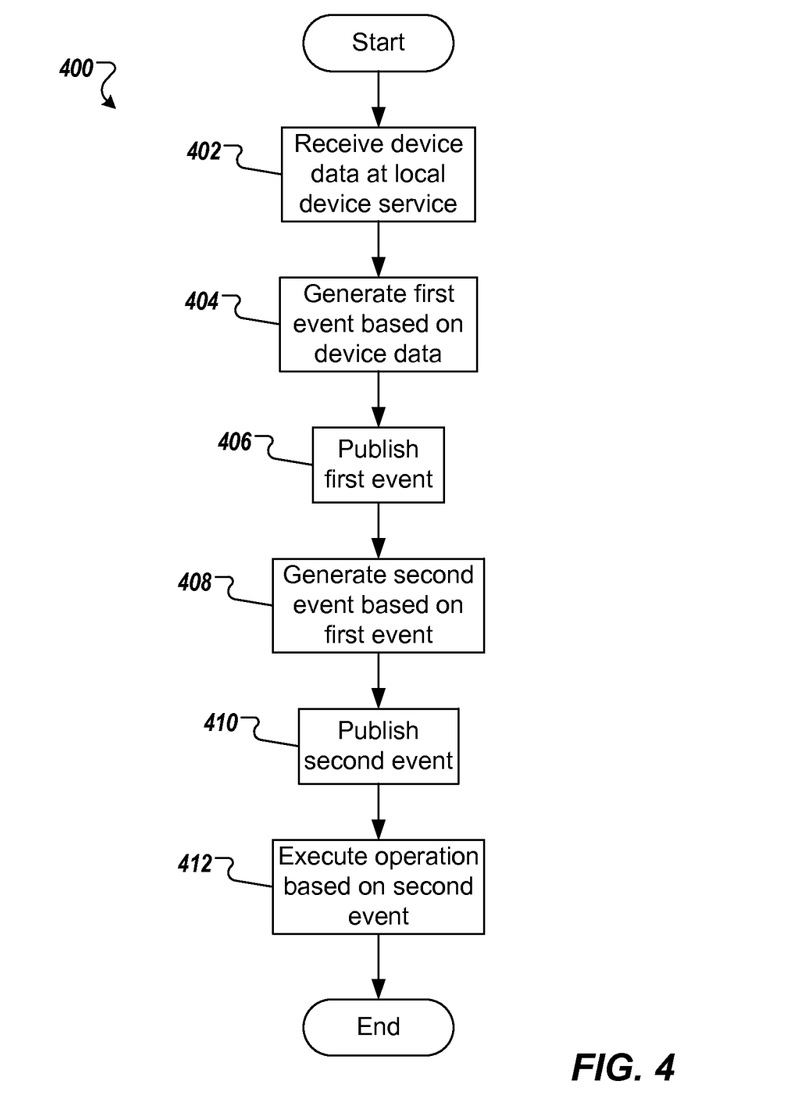
FIG. 4 is a flowchart illustrating an example process that can be executed in implementations of the present disclosure.

FIG. 4 depicts a flowchart of an example process 400 that can be executed in implementations of the present disclosure. The example process 400 can be provided using one or more computer programs that can be executed using one or more computing devices (e.g., the client device 102 and/or the client device 104). The example process 400 can be executed to execute one or more operations based on and in response to data generated by a device.

Device data is received at an LDS (402). For example, an active device can send data to a corresponding LDS 242 (i.e., the LDS that handles the particular device) through a corresponding communication service 244 (i.e., the communication service that enables communication with the particular device). A first event is generated based on the device data (404). For example, the LDS 242 generates the first event, which includes the device data. The first event is published (406). A second event is generated based on the first event (408). For example, the local EDS 212 processes the first event and generates a second event that includes the scanned data. The second event is published (410). One or more operations are executed based on the second event (412). For example, the UI processes the second event and performs some action based thereon.

Figure 5:
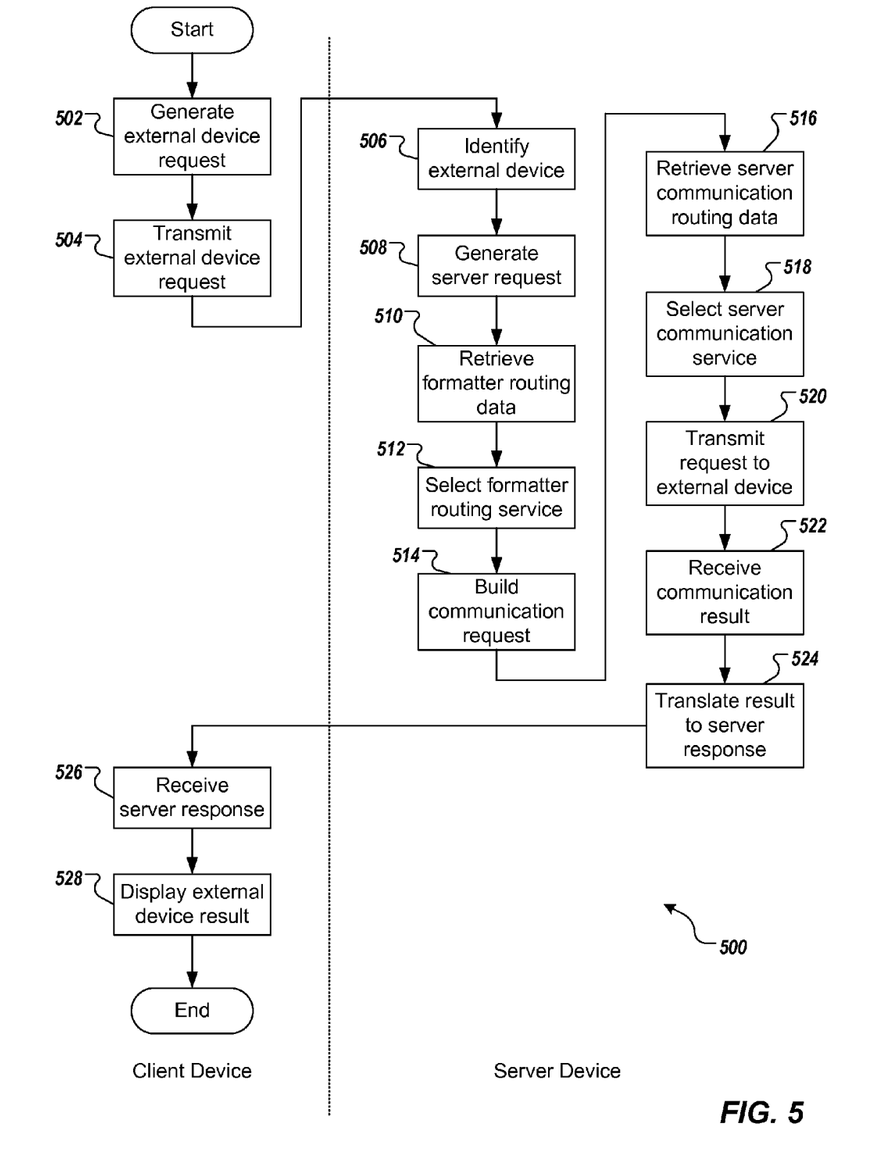
FIG. 5 is a flowchart illustrating an example process that can be executed in implementations of the present disclosure.

FIG. 5 depicts a flowchart of an example process 500 that can be executed in implementations of the present disclosure. The example process 500 can be provided using one or more computer programs that can be executed using one or more computing devices (e.g., the client device 102, the client device 104 and/or the server devices 108). The example process 500 can be executed to enable communication with external devices.

An external device request is generated (502). The external device request is transmitted (504). For example, the UI executing on a client device 102, 104 can generate an external device request and can send the external device request to the server device 108 over the network 110. The external device request is received and an external device is identified (506). For example, the server device 108 receives and processes the external device request to identify which external device should be used to fulfill the external device request. A server request is generated (508). For example, the server device 108 generates a server EDS request based on the identified external device. Formatter routing data is retrieved (510). For example, the server request is processed using the server EDS 210, which retrieves formatter routing data from the data service 232. A formatter service is selected (512). For example, the server EDS 210 uses the formatter routing data to determine which formatter service 230 to use based on the given request type and the external device. A communication request is built (514). For example, the server EDS 210 uses the identified formatter service 230 to build the communication request. Server communication routing data is retrieved (516). For example, the server EDS 210 retrieves server communication routing data from the data service 232.

A server communication service is selected (518). For example, the server EDS 210 uses the server communication routing data to identify a server communication service 234 based on the given external device. The server request is transmitted to the external device (520). For example, the server EDS 210 uses the selected server communication service 234 to transmit the server EDS request to the external device. A communication result is received (522). For example, the result of the communication with the external device (whether direct or through the local EDS 212) is received by the server communication service 234 and is provided to the formatter service 230. The communication result is translated to provide a server response (524). For example, the formatter service 230 translates the communication result into a server EDS response, and the server device 108 transmits the server EDS response to the client device 102, 104. The server response is received (526). The server response is processed to perform one or more operations. For example, the external device result is displayed using the UI (528). For example, the client device 102, 104 processes the server EDS response and the UI displays the result of using the external device to the user.

Implementations of the present disclosure provide one or more of the following attributes. In some aspects, formatter routing, server communication routing and local communication routing enable new formatter services and communication services corresponding to newly connected devices to be plugged in without making a change to the overall external device architecture. In some aspects, the external device architecture is able to handle devices that actively send data to applications executing on the client device as well as passive devices that are used by the applications. In some aspects, the external device architecture is able to handle communication with devices on the network as well as local devices connected to the client device (e.g., a user's workstation). In some aspects, the use of a generic communication interface enables the external device architecture to support many different types of request and response objects.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

What is claimed is:

1. A computer-implemented method for facilitating travel on a travel conveyance, the method being executed using one or more processors and comprising:

executing a user interface on a computing device, the computing device being used by a user to facilitate the travel on the travel conveyance;

determining that a first device is connected for local communication with the computing device and that a second device is connected for non-local communication with the computing device, and in response, updating a configuration of the user interface to integrate the first device and the second device;

generating one or more event handlers executed on the computing device, each event handler corresponding to a local device service file;

receiving first data at a first event handler of the one or more event handlers, the first event handler corresponding to a first local device service associated with the first device;

generating, using the first event handler, a first event that comprises the first data;

receiving, at a local external device service, the first event;

generating, using the local external device service, a first external device event based on the first event;

performing a first action based on the first external device event, the first action being associated with fulfilling the travel on the travel conveyance;

receiving, at a server external device service, a request associated with the second device and associated with fulfilling the travel on the travel conveyance;

generating, using the server external device service, a server external device request based on the request; and transmitting the server external device request to the second device.

2. The computer-implemented method of claim 1, further comprising:

determining that a third device is connected for local communication with the computing device, and in response, updating the configuration of the user interface to integrate the third device;

receiving second data at a second event handler of the one or more event handlers, the second event handler corresponding to a second local device service associated with the third device;

generating, using the second event handler, a second event that comprises the second data;

receiving, at the local external device service, the second event;

generating, using the local external device service, a second external device event based on the second event; and performing a second action based on the second external device event, the second action being associated with fulfilling the travel on the travel conveyance.

3. The computer-implemented method of claim 1, wherein the first event handler subscribes to events generated by at least the first device.

4. The computer-implemented method of claim 1, wherein a communication service enables communication of the first data from the first device to the first local device service.

5. The computer-implemented method of claim 4, wherein the communication service is exclusive to the first device and to the first local device service.

6. The computer-implemented method of claim 1, wherein the first event further comprises a device identifier of the first device and a type of the first data.

7. The computer-implemented method of claim 1, further comprising transitioning the first local device service to a "waiting for data" state after transmitting the first event from the first local device service to the local external device service.

8. The computer-implemented method of claim 1, wherein the first external device event comprises a device identifier of the first device, a type of the first data and the first data.

9. The computer-implemented method of claim 1, further comprising transitioning the local external device service to a "waiting for data" state after transmitting the first external device event from the local external device service to an application executing on the computing device.

10. The computer-implemented method of claim 1, wherein an application that is executed on the computing device and that is associated with the user interface performs the first action.

11. The computer-implemented method of claim 1, wherein the configuration of the user interface defines one or more local device service files that are to be used.

12. The computer-implemented method of claim 1, wherein the local external device service is executed on the computing device.

13. The computer-implemented method of claim 1, wherein the server external device service is executed on a server, the server being in communication with the computing device.

14. The computer-implemented method of claim 1, wherein the local device service file is provided as a dynamic link library (DLL) file.

15. The computer-implemented method of claim 1, wherein the first device comprises one of a scanner and a scale.

16. The computer-implemented method of claim 1, wherein the computing device comprises one of a kiosk and a terminal.

17. The computer-implemented method of claim 1, wherein the first action comprises one of checking in a passenger for travel on a travel conveyance and boarding a passenger for travel on a travel conveyance.

18. The computer-implemented method of claim 1, wherein the second device comprises a printer.

19. The computer-implemented method of claim 1, further comprising performing a second action on the second device.

20. The computer-implemented method of claim 1, further comprising receiving a communication result from the second device.

21. A non-transitory computer-readable storage medium coupled to one or more processors and having instructions stored thereon which, when executed by the one or more processors, cause the one or more processors to perform operations for facilitating travel on a travel conveyance, the operations comprising:

executing a user interface on a computing device, the computing device being used by a user to facilitate the travel on the travel conveyance;

determining that a first device is connected for local communication with the computing device and that a second device is connected for non-local communication with the computing device, and in response, updating a configuration of the user interface to integrate the first device and the second device;

generating one or more event handlers executed on the computing device, each event handler corresponding to a local device service file;

receiving first data at a first event handler of the one or more event handlers, the first event handler corresponding to a first local device service associated with the first device;

generating, using the first event handler, a first event that comprises the first data;

receiving, at a local external device service, the first event;

generating, using the local external device service, a first external device event based on the first event;

performing a first action based on the first external device event, the first action being associated with fulfilling the travel on the travel conveyance;

receiving, at a server external device service, a request associated with the second device and associated with fulfilling the travel on the travel conveyance;

generating, using the server external device service, a server external device request based on the request; and transmitting the server external device request to the second device.

22. A system, comprising:

one or more processors; and a computer-readable storage medium coupled to the one or more processors having instructions stored thereon which, when executed by the one or more processors, cause the one or more processors to perform operations for facilitating travel on a travel conveyance, the operations comprising:

executing a user interface on a computing device via the one or more processors, the computing device being used to facilitate the travel on the travel conveyance;

determining that a first device is connected for local communication with the computing device and that a second device is connected for non-local communication with the computing device, and in response, updating a configuration of the user interface to integrate the first device and the second device;

generating one or more event handlers, each event handler corresponding to a local device service file;

receiving first data at a first event handler of the one or more event handlers, the first event handler corresponding to a first local device service associated with the first device;

generating, using the first event handler, a first event that comprises the first data;

receiving, at a local external device service, the first event;

generating, using the local external device service, a first external device event based on the first event;

performing a first action based on the first external device event, the first action being associated with fulfilling the travel on the travel conveyance;

receiving, at a server external device service, a request associated with the second device and associated with fulfilling the travel on the travel conveyance;

generating, using the server external device service, a server external device request based on the request; and     transmitting the server external device request to the second device.

\* \* \* \* \*